United States Patent
Tamura

(10) Patent No.: US 9,531,476 B2
(45) Date of Patent: Dec. 27, 2016

(54) OPTICAL COMMUNICATION MODULE

(71) Applicant: Hitachi Metals, Ltd., Tokyo (JP)

(72) Inventor: Kenichi Tamura, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 62 days.

(21) Appl. No.: 14/550,836

(22) Filed: Nov. 21, 2014

(65) Prior Publication Data

US 2015/0346432 A1    Dec. 3, 2015

(30) Foreign Application Priority Data

May 28, 2014 (JP) ................................. 2014-110687

(51) Int. Cl.
| | | |
|---|---|---|
| *H04B 10/00* | (2013.01) | |
| *H04B 10/50* | (2013.01) | |
| *G02B 6/42* | (2006.01) | |
| *G02B 6/43* | (2006.01) | |

(52) U.S. Cl.
CPC .......... *H04B 10/504* (2013.01); *G02B 6/4215* (2013.01); *G02B 6/4246* (2013.01); *G02B 6/4204* (2013.01); *G02B 6/4267* (2013.01); *G02B 6/43* (2013.01)

(58) Field of Classification Search
CPC .................................................. H04B 10/504
See application file for complete search history.

(56) References Cited

U.S. PATENT DOCUMENTS

| | | | | |
|---|---|---|---|---|
| 5,625,636 A | * | 4/1997 | Bryan ............... | G02B 6/12004 372/50.124 |
| 5,835,646 A | * | 11/1998 | Yoshimura ........... | G02B 6/262 385/134 |
| 6,198,864 B1 | * | 3/2001 | Lemoff ............. | G02B 6/29367 385/24 |
| 6,201,908 B1 | * | 3/2001 | Grann ............... | G02B 6/29358 385/24 |
| 6,941,047 B2 | * | 9/2005 | Capewell .......... | G02B 6/29367 385/33 |
| 7,333,692 B1 | * | 2/2008 | Mossberg .......... | G02B 6/12007 385/15 |

(Continued)

FOREIGN PATENT DOCUMENTS

JP    2013-080900 A    5/2013

*Primary Examiner* — Danny Leung
(74) *Attorney, Agent, or Firm* — McGinn IP Law Group, PLLC.

(57) ABSTRACT

An optical communication module includes a plurality of semiconductor lasers that emit optical signals with different wavelengths, a multiplexing optical system including a plurality of optical filters used for multiplexing the optical signals, each of which has been emitted from a corresponding one of the plurality of semiconductor lasers, and a substrate on which the optical filters are provided, and a plurality of lenses, each of the lenses being joined to a corresponding one of the plurality of optical filters to condense or collimate an optical signal emitted from a corresponding one of the semiconductor lasers and thereby enable the light signal to enter the optical filter. The plurality of lenses are independent from one another and have a different linear expansion ratio from that of the substrate. Furthermore, the plurality of lenses are not in contact with a second mount on which the substrate is mounted.

12 Claims, 8 Drawing Sheets

(56) References Cited

U.S. PATENT DOCUMENTS

| | | | | |
|---|---|---|---|---|
| 8,488,244 B1* | 7/2013 | Li | ............... | G02B 27/1006 |
| | | | | 359/618 |
| 2004/0184811 A1* | 9/2004 | Takamori | ............... | G02B 6/423 |
| | | | | 398/141 |
| 2005/0006678 A1* | 1/2005 | Tanaka | ............... | H01L 31/1075 |
| | | | | 257/292 |
| 2008/0013886 A1* | 1/2008 | Morris | ............... | G02B 6/29367 |
| | | | | 385/39 |
| 2008/0128627 A1* | 6/2008 | Lundquist | ............... | G01N 21/6452 |
| | | | | 250/363.01 |
| 2009/0103866 A1* | 4/2009 | Morris | ............... | G02B 6/29367 |
| | | | | 385/39 |
| 2010/0086331 A1* | 4/2010 | Inoue | ............... | G03G 15/326 |
| | | | | 399/220 |
| 2013/0011104 A1* | 1/2013 | Sato | ............... | G02B 6/4244 |
| | | | | 385/93 |
| 2015/0346432 A1* | 12/2015 | Tamura | ............... | H04B 10/504 |
| | | | | 398/88 |

* cited by examiner

OPTICAL COMMUNICATION MODULE

The present application is based on Japanese patent application No. 2014-110687 filed on May 28, 2014, the entire contents of which are incorporated herein by reference.

BACKGROUND OF THE INVENTION

1. Field of the Invention

The present invention relates to optical communication modules, and more particularly, relates to an optical communication module used for wavelength division multiplexing.

2. Description of the Related Art

In the field of optical communications, the transmission capacity per optical fiber cable has been increasing, and wavelength division multiplexing (WDM) as a communication method which realizes such increased transmission capacity is known. In wavelength division multiplexing, a plurality of optical signals with different wavelengths are simultaneously transmitted using a signal optical fiber.

An optical communication module used for wavelength division multiplexing is an optical transceiver. An optical transceiver used for wavelength division multiplexing includes a light emitting module including at least a plurality of light sources that emit light beams (optical signals) with different wavelengths, a lens that condense and collimates signals emitted from the light sources, and a multiplexing optical system that multiplexes optical signals condensed or collimated by the lens. Note that there are cases where the light emitting module is called a "transmitter optical module", a "transmitter optical sub-assembly", or the like.

Japanese Unexamined Patent Application Publication No. 2013-80900 (paragraphs [0056]-[0058], FIG. 11B) describes a light emitting module including a plurality of semiconductor lasers 44, a plurality of lens parts 46a that condense optical signals (signal light beams) emitted from the semiconductor lasers 44, and an optical multiplexer 48 in which an optical waveguide that multiplexes optical signals condensed by each of the lens parts 46a.

SUMMARY OF THE INVENTION

In the light emitting module, the optical transmission module, the optical transmission sub-assembly, or the like, which has the above-described structure, the optical axis deviates when these members are expanded due to a temperature change, assuming that the linear expansion ratios (linear expansion coefficient) between the multiplexing optical system and the lenses mounted on a common mounting surface differ from one another. Specifically, a deviation of the optical axis relative to a direction perpendicular to the mounting surface tends to occur. Thus, conventionally, as materials for the multiplexing optical system and the lenses, materials which have the same linear expansion ratio, or materials, the linear expansion ratios, of which have been adjusted to be the same, have been used. For example, as a material for the optical multiplexer 48 and the lens parts 46a described in Japanese Unexamined Patent Application Publication No. 2013-80900, in general, glass is used. That is, in the known light emitting module, the transmitter optical module, the transmitter optical transmission sub-assembly, or the like, a glass lens is used as the lens that condenses and collimates optical signals emitted from the light sources.

However, glass lenses are more expensive than resin lenses (plastic lenses), and this has been a reason for the high production cost of an optical communication module including an optical transceiver.

It is therefore an object of the present invention is to enable use of materials which have different linear expansion ratios for a lens that condenses or collimates optical signals emitted from light sources and a multiplexing optical system that multiplexes the optical signals condensed or collimated by the lens.

An optical communication module according to the present invention is an optical communication module for outputting a multiplexed optical signal and includes a plurality of semiconductor lasers that emit optical signals with different wavelengths, a multiplexing optical system including a plurality of optical filters used for multiplexing the optical signals, each of which has been emitted from a corresponding one of the plurality of semiconductor lasers, and a substrate on which the optical filters are provided, and a plurality of lenses, each of the lenses being joined to a corresponding one of the plurality of optical filters to condense or collimate an optical signal emitted from a corresponding one of the semiconductor lasers to the optical filter and thereby enable the light signal to enter the optical filter. The plurality of lenses are independent from one another and have a different linear expansion ratio from that of the substrate. Furthermore, and the plurality of lenses are not in contact with a supporting member on which the substrate is mounted.

According to one embodiment of the present invention, the substrate is made of glass and the lens is made of synthetic resin.

According to another embodiment of the present invention, light emission surfaces of the optical filters are joined to a surface of the substrate, and the lenses are joined to light incidence surfaces of the optical filters.

According to still another embodiment of the present invention, non-reflection coating has been performed on the lenses.

According to the present invention, materials with different linear expansion ratios can be used for a lens that condenses and collimates optical signals emitted from light sources and a multiplexing optical system that multiplexes the optical signals condensed or collimated by the lens.

DESCRIPTION OF THE PREFERRED EMBODIMENTS

An example optical communication module to which the present invention is applied will be described in detail with reference to the accompanying drawings. The optical communication module described below is a WDM optical transceiver that complies with the QSFP+ (Quad Small Form-Factor Pluggable Plus) standard, and outputs a multiplex optical signal obtained by multiplexing a plurality of optical signals which have different wavelengths.

Figure 1:
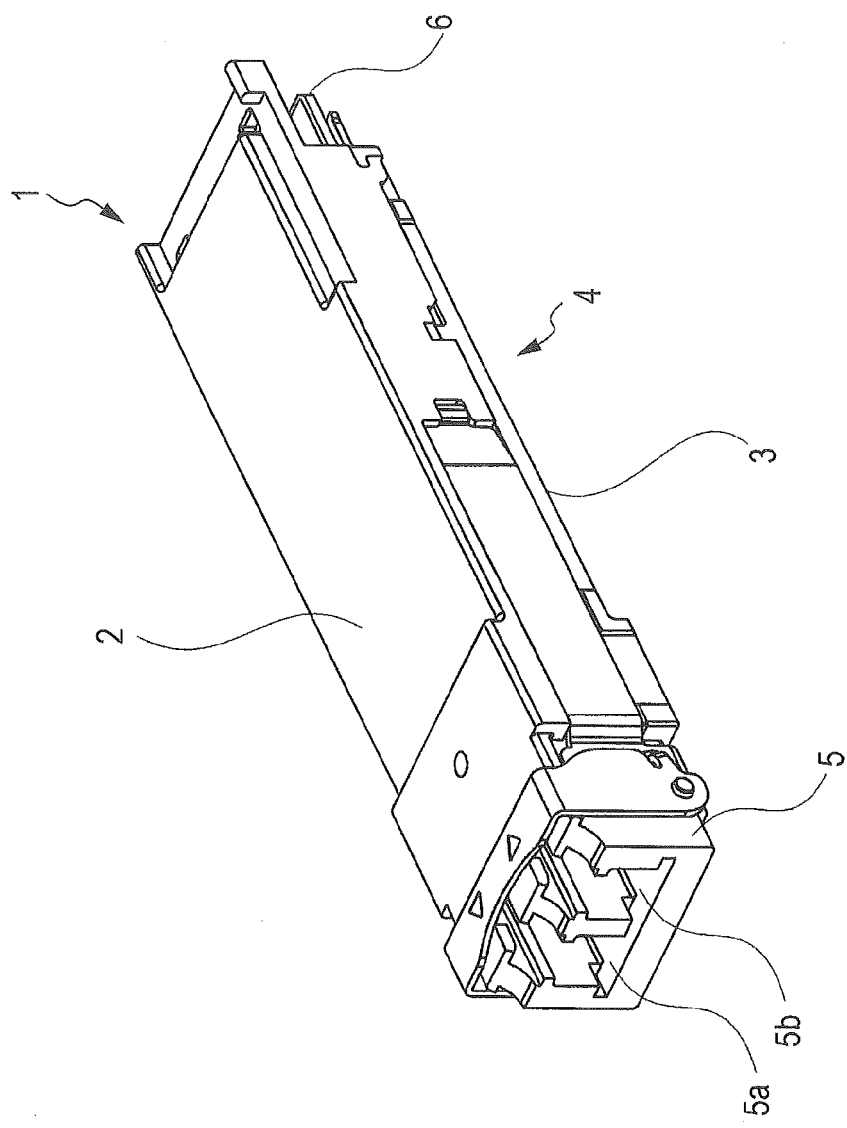
FIG. 1 is a perspective view illustrating an external appearance of an optical transceiver.

As illustrated in FIG. 1, an optical transceiver 1 according to this embodiment includes a module case 4 including an upper case 2 and a lower case 3. The module case 4 has a rectangular parallelepiped exterior appearance as a whole and dimensions that comply with the QSFP+ standard. An optical adaptor 5 is provided at one end of the module case 4 in the longitudinal direction of the module case 4, and a card edge 6 is provided at the other end of the module case 4 in the longitudinal direction. Note that there are cases where the card edge is called an "edge connecter". In the following description, there are cases where one of the end portions of the module case 4 in the longitudinal direction thereof in which the optical adaptor 5 is provided is called a "front side", and the other one thereof in which the card edge 6 is provided is called a "rear side". That is, the optical adaptor 5 is provided at the front side of the module case 4, and the card edge 6 is provided on the rear side of the module case 4.

In the optical adaptor 5, two insertion ports 5a and 5b, into which an optical connector attached to one end of an optical fiber (not illustrated), are provided. One of the insertion ports 5a and 5b, that is, the insertion port 5a, is a transmission (TX) insertion port, and the other one thereof, that is, the insertion port 5b, is a reception (RX) insertion port. When the card edge 6 is inserted in a slot of a network device (a router, a server, or the like), which is not illustrated, the optical transceiver 1 and the network device are connected to each other. The optical transceiver 1 converts an electrical signal that has been input from the connected network device to an optical signal and outputs the converted signal to an optical fiber cable connected to the transmission insertion port 5a, and converts an optical signal that has been input from an optical fiber cable connected to the reception insertion port 5b to an electric signal and outputs the converted signal to the network device.

Figure 2:
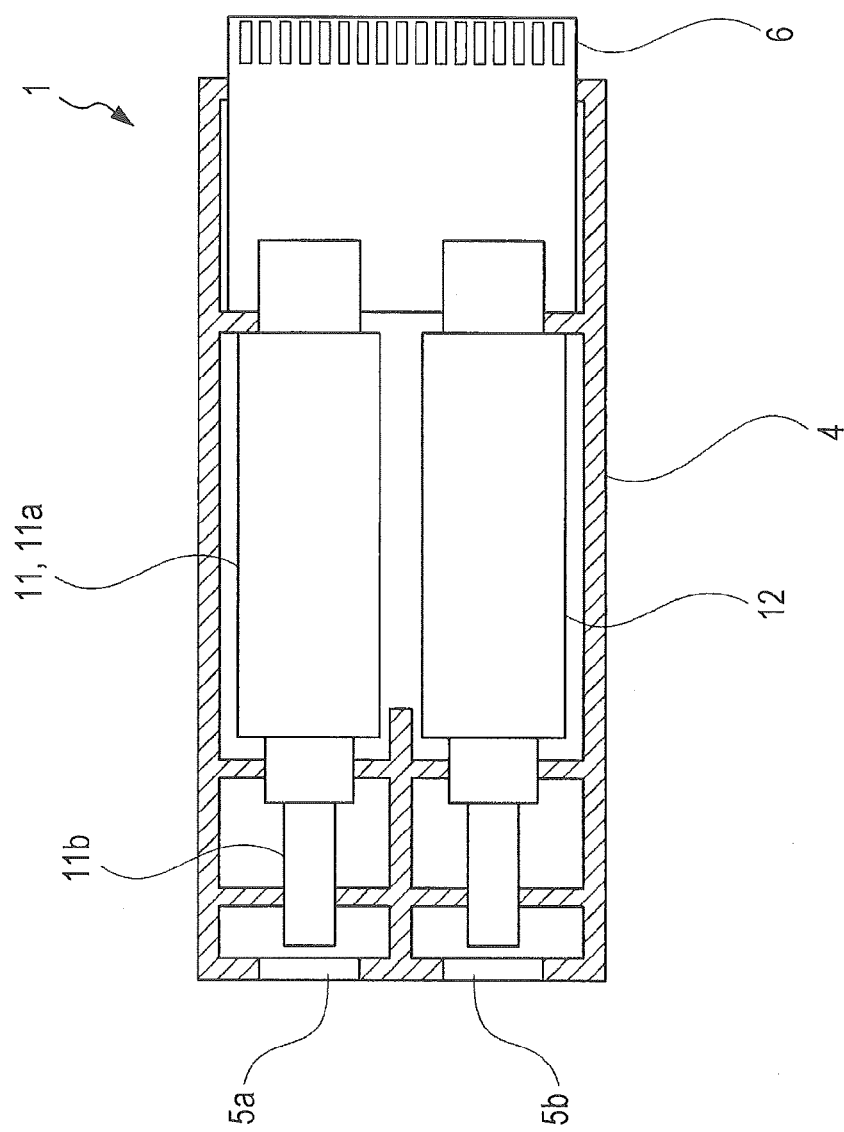
FIG. 2 is a cross-sectional view illustrating an inner structure of the optical transceiver.

As illustrated in FIG. 2, a transmitter optical sub-assembly (TOSA) 11 and a receiver optical sub-assembly (ROSA) 12 that realize the above-described photoelectric conversion are accommodated in the module case 4.

Figure 3:
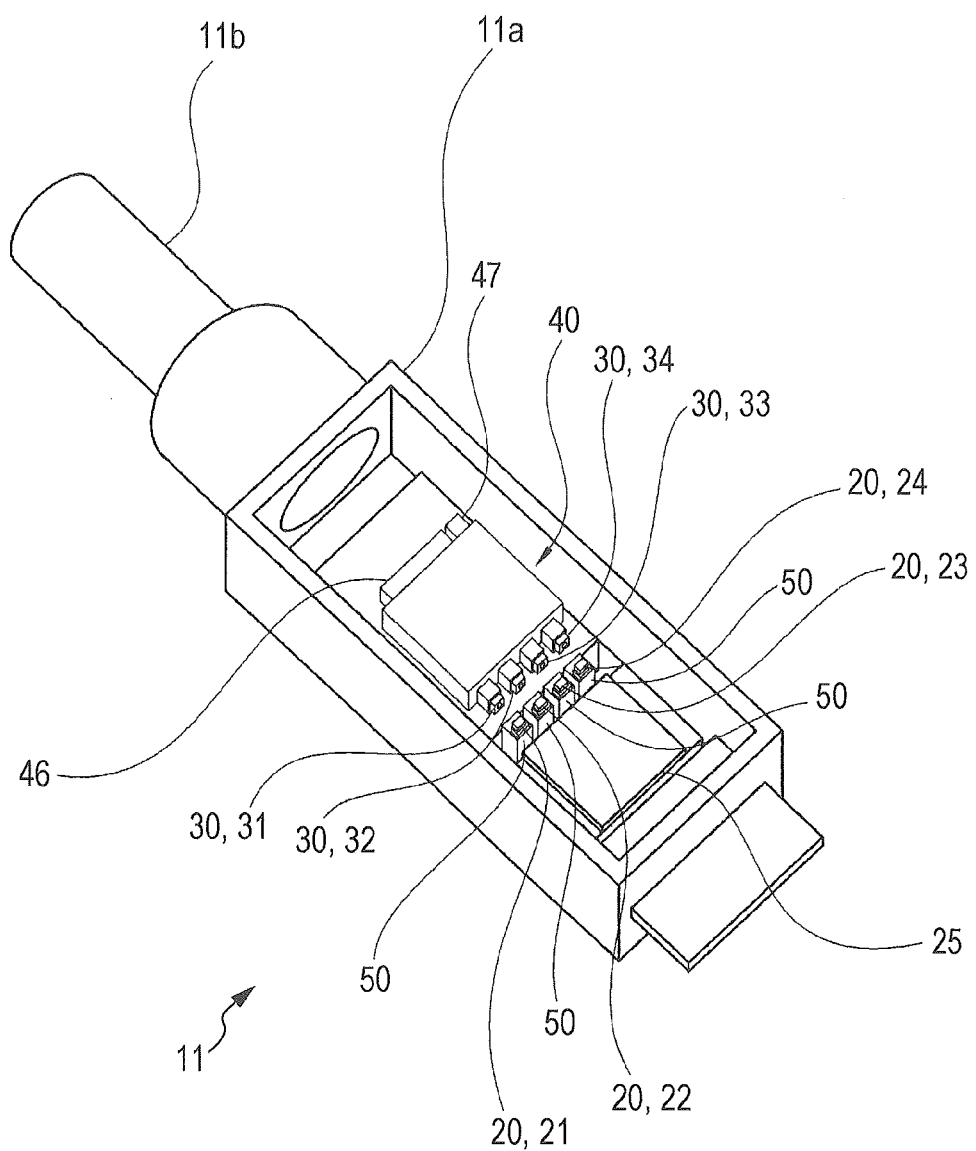
FIG. 3 is a cross-sectional view illustrating an inner structure of a transmitter optical sub-assembly.

As illustrated in FIG. 3, the transmitter optical sub-assembly 11 includes a package 11a and a plurality of semiconductor lasers 20 accommodated in the package 11a. Specifically, the transmitter optical sub-assembly 11 includes a first semiconductor laser 21, a second semiconductor laser 22, a third semiconductor laser 23, and a fourth semiconductor laser 24. The first semiconductor laser 21, the second semiconductor laser 22, the third semiconductor laser 23, and the fourth semiconductor laser 24 are connected to a laser driver 25 via a bonding wire (not illustrated).

Furthermore, the transmitter optical sub-assembly 11 includes a plurality of lenses 30 that collimate signals emitted from the first semiconductor laser 21, the second semiconductor laser 22, the third semiconductor laser 23, and the fourth semiconductor laser 24. Specifically, the transmitter optical sub-assembly 11 includes a first lens 31, a second lens 32, a third lens 33, and a fourth lens 34.

Furthermore, the transmitter optical sub-assembly 11 includes a multiplexing optical system 40 that multiplexes the plurality of optical signals that have been collimated by the first lens 31, the second lens 32, the third lens 33, and the fourth lens 34.

In the following description, there are cases where the first semiconductor laser 21, the second semiconductor laser 22, the third semiconductor laser 23, and the fourth semiconductor laser 24 are generally referred to as "semiconductor lasers 20". Also, there are cases where the first lens 31, the second lens 32, the third lens 33, and the fourth lens 34 are generally referred to as "lenses 30". Furthermore, there are cases where an optical signal emitted from the first semiconductor laser 21 is called a "first optical signal", an optical signal emitted from the second semiconductor laser 22 is called a "second optical signal", an optical signal emitted from the third semiconductor laser 23 is called a "third optical signal", and an optical signal emitted from the fourth semiconductor laser 24 is called a "fourth optical signal". There are cases where the first to fourth optical signals are generally referred to as "optical signals".

The semiconductor lasers 20 are edge emitting lasers (EELs) and are mounted in the form of a bare chip that is not packaged. The semiconductor lasers 20 are mounted in the form of a bare chip in order to reduce the array pitch of the semiconductor lasers 20 to thus realize a reduction in the size of the transmitter optical sub-assembly 11, and furthermore, to realize a reduction in the size of the optical transceiver 1.

Figure 4:
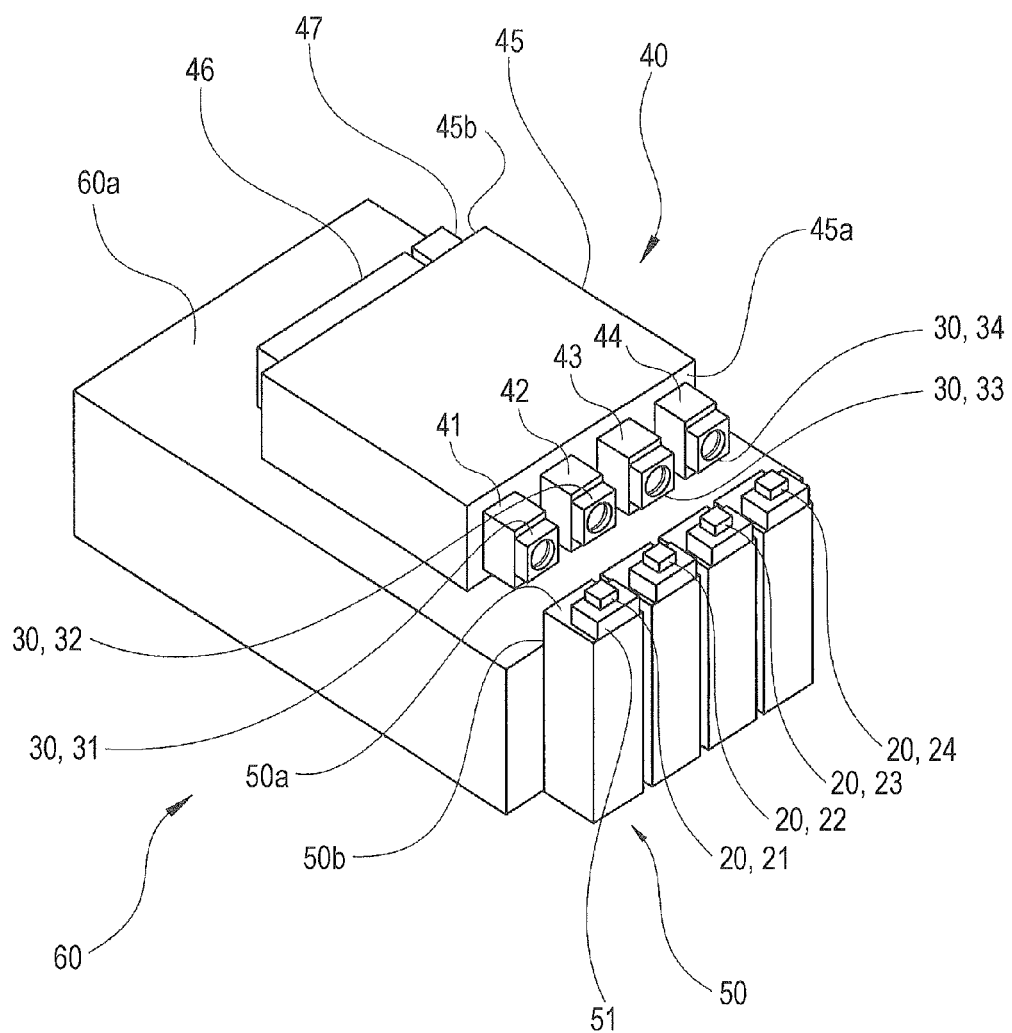
FIG. 4 is an enlarged perspective view illustrating semiconductor lasers, lenses, and a multiplexing optical system.

As illustrated in FIG. 4, each of the semiconductor lasers 20 is mounted on a first mount 50 serving as a supporting member via a sub-mount 51. Each of the first mounts 50 is a metal block having a quadrangular prism shape. The semiconductor laser 20 is mounted on one end surface (an upper end surface 50a) of the first mount 50 in the longitudinal direction via the sub-mount 51. That is, the upper end surface 50a of the first mount 50 is a first mounting surface on which the semiconductor laser 20 is mounted. The sub-mount 51 in this embodiment is made of a ceramic.

The first semiconductor laser 21, the second semiconductor laser 22, the third semiconductor laser 23, and the fourth semiconductor laser 24 are arranged linearly in this order. The oscillation wavelength (the center wavelength) of the first semiconductor laser 21 is $\lambda 1$ nm, the oscillation wavelength (the center wavelength) of the second semiconductor laser 22 is $\lambda 2$ nm, the oscillation wavelength (the center wavelength) of the third semiconductor laser 23 is $\lambda 3$ nm, and the oscillation wavelength (the center wavelength) of the fourth semiconductor laser 24 is $\lambda 4$ nm. In other words, the wavelength of the first optical signal is $\lambda 1$ nm, the wavelength of the second optical signal is $\lambda 2$ nm, the wavelength of the third optical signal is $\lambda 0$ nm, and the wavelength of the fourth optical signal is $\lambda 4$ nm. The magnitude relationship of these wavelengths is $\lambda 1 < \lambda 2 < \lambda 3 < \lambda 4$. Also, the wavelength interval of each optical signal is 20 nm.

The multiplexing optical system 40 is mounted on a second mount 60 serving as a supporting member. The second mount 60 is a metal block that is separate from the first mount 50, and has a flatter shape than the first mount 50. The second mount 60 has a surface (an upper surface 60a) that is parallel to a first mounting surface 50a, and the multiplexing optical system 40 is mounted on the upper surface 60a. That is, the upper surface 60a of the second mount 60 is a second mounting surface on which the multiplexing optical system 40 is mounted.

Each of the lenses 30 is fixed to the multiplexing optical system 40 mounted on the second mount 60 and does not contact the second mount 60. The relationship between the lenses 30 and the multiplexing optical system 40 will be described later.

Figure 5:
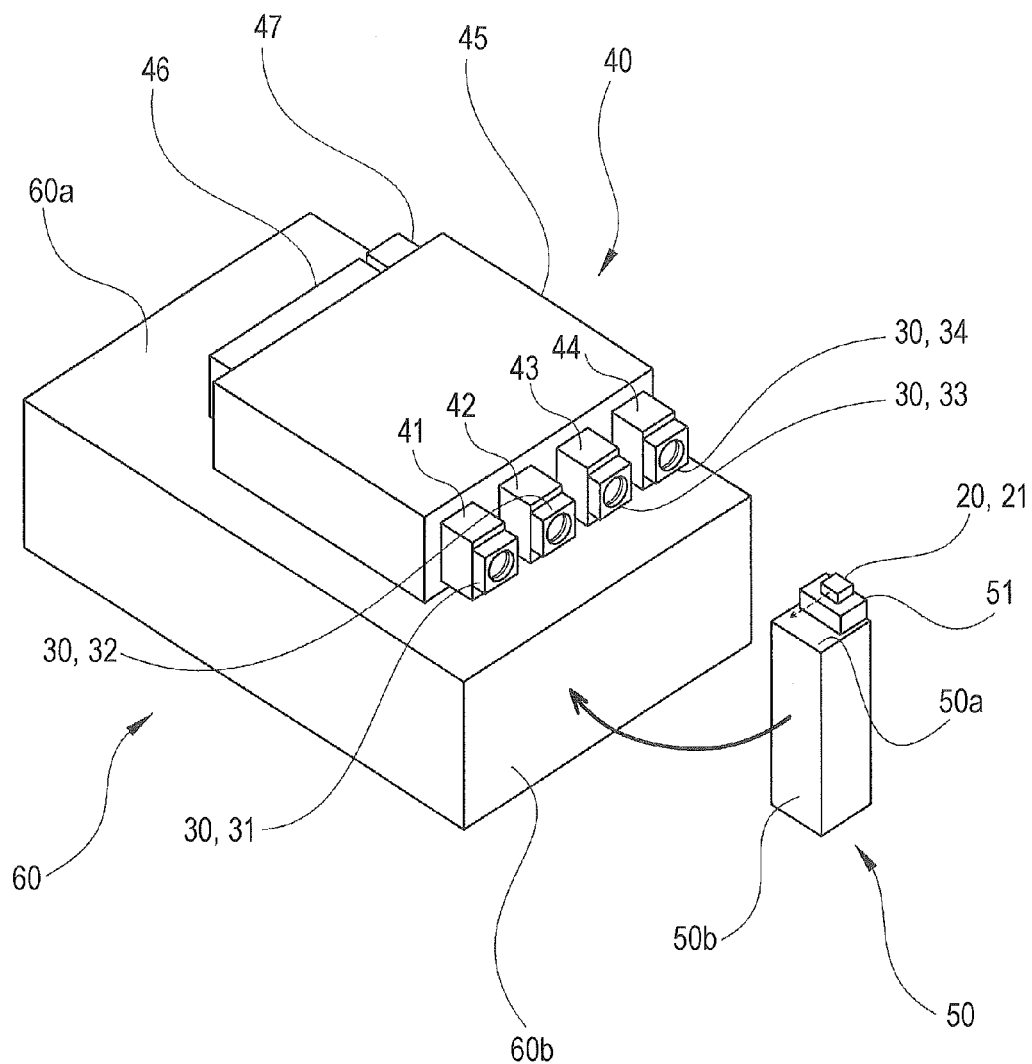
FIG. 5 is an enlarged perspective view illustrating a first side surface of a first mount and a second side surface of a second mount.

As illustrated in FIG. 5, each of the first mounts 50 has a first side surface 50b that intersects the first mounting surface 50a on which a corresponding one of the semiconductor lasers 20 is mounted. On the other hand, the second mount 60 has a second side surface 60b that intersects a second mounting surface 60a on which the multiplexing optical system 40 is mounted.

The first mount 50 is fixed to the second mount 60 in a state where the first side surface 50b abuts the second side surface 60b. Specifically, the first side surface 50b of the first mount 50 is laser welded (YAG laser welded in this embodiment) to the second side surface 60b of the second mount 60. That is, the semiconductor lasers 20 and the multiplexing optical system 40 are mounted on different supporting members.

FIG. 4 will be referred to again. The multiplexing optical system 40 mounted on the second mount 60 includes a glass plate 41, bandpass filters 42, 43, and 44, a substrate 45 having a rectangular parallelepiped shape, a reflection mirror 46, and an antireflective (AR) filter 47. The glass plate 41 and the bandpass filters 42, 43, and 44 are joined to one surface (a side surface 45a) of the substrate 45 which faces the semiconductor lasers 20. The reflection mirror 46 and the AR filter 47 are joined to the other surface (a side surface 45b) of the substrate 45 which is located on the opposite side to the surface on which the glass plate 41 and the bandpass filters 42, 43, and 44 are provided.

The glass plate 41 is a simple glass having a surface that has not been subjected to any processing. On the other hand, the AR filter 47 is an optical filter in which non-reflection coating (AR coating) has been performed on at least one surface of a glass plate. The bandpass filters 42, 43, and 44 are optical filters in which a dielectric multi-layer is formed on at least one surface of a glass plate. The glass plate 41 and the bandpass filters 42, 43, and 44 are arranged linearly along the direction of the array of the semiconductor lasers 20.

Figure 6:
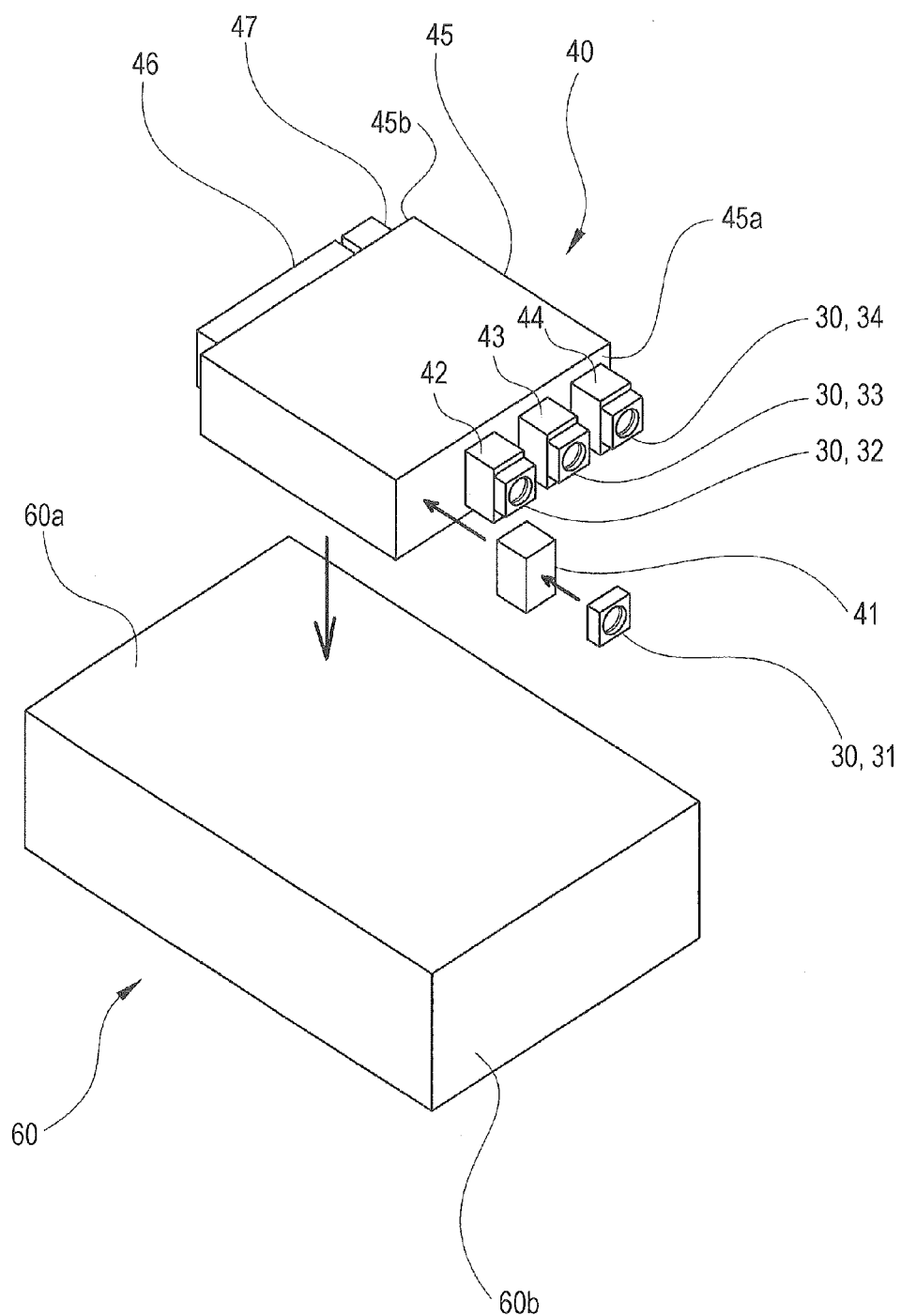
FIG. 6 is an explanatory view illustrating a step of bonding the lenses and an AR filter to a substrate.

The substrate 45 of the multiplexing optical system 40 is made of glass. On the other hand, the first lens 31, the second lens 32, the third lens 33, and the fourth lens 34 are separate lenses made of synthetic resin, and non-reflection coating (AR coating) has been performed on each of the lenses. As illustrated in FIG. 6, the first lens 31 is joined to the light incidence surface of the glass plate 41, the second lens 32 is joined to the light incidence surface of the bandpass filter 42, the third lens 33 is joined to the light incidence surface of the bandpass filter 43, and the fourth lens 34 is joined to the light incidence surface of the bandpass filter 44. In this embodiment, each of the lenses 30 is adhered (bonded) to a corresponding one of the light incidence surfaces of the glass plate 41 and the bandpass filters 42, 43, and 44. Note that the light incidence surface of the glass plate 41 or the bandpass filter 42, 43, or 44 is the other surface of the substrate 45, which is on the opposite side to the surface joined to the side surface 45a of the substrate 45. In other words, the surface joined to the side surface 45a of the substrate 45 is a light emission surface.

As illustrated in FIG. 4, the first lens 31 and the glass plate 41 correspond to the first semiconductor laser 21, and the first optical signal emitted from the first semiconductor laser 21 and collimated by the first lens element 31 enters the glass plate 41. The second lens element 32 and the bandpass filter 42 correspond to the second semiconductor laser 22, and the second optical signal emitted from the second semiconductor laser 22 is collimated by the second lens element 32 and enters the bandpass filter 42. The third lens element 33 and the bandpass filter 43 correspond to the third semiconductor laser 23, and the third optical signal emitted from the third semiconductor laser 23 is collimated by the third lens element 33 and enters the bandpass filter 43. The fourth lens element 34 and the bandpass filter 44 correspond to the fourth semiconductor laser 24, and the fourth optical signal emitted from the fourth semiconductor laser 24 is collimated by the fourth lens element 34 and enters the bandpass filter 44.

In order to cause an optical signal to enter the multiplexing optical system 40 with low loss, the first semiconductor laser 21, the first lens element 31, and the glass plate 41, which correspond to one another, are aligned. For a similar reason, the second semiconductor laser 22, the second lens element 32, and the bandpass filter 42 are aligned, the third semiconductor laser 23, the third lens element 33, and the bandpass filter 43 are aligned, and the fourth semiconductor laser 24, the fourth lens element 34, and the bandpass filter 44 are aligned.

The glass plate 41 transmits the first optical signal with low loss. The bandpass filters have different pass bands. Specifically, the bandpass filter 42 blocks at least the first optical signal and transmits the second optical signal. The bandpass filter 43 blocks at least the first optical signal and the second optical signal and transmits the third optical signal. The bandpass filter 44 blocks at least the first optical signal, the second optical signal, and the third optical signal and transmits the fourth optical signal. On the other hand, the reflection mirror 46 is a so-called total reflection mirror and reflects at least the first optical signal, the second optical signal, and the third optical signal.

The AR filter 47 including a non-reflection coat transmits the first optical signal, the second optical signal, the third optical signal, and the fourth optical signal with low loss. That is, a multiplex optical signal obtained by performing wavelength division multiplexing on the first optical signal, the second optical signal, the third optical signal, and the fourth optical signal is emitted through the AR filter 47. The multiplex optical signal emitted through the AR filter 47 enters a light condensing lens (not illustrated) provided between the package 11a and a receptacle 11b illustrated in FIG. 2 and FIG. 3, and is condensed to a ferrule (not illustrated) in the receptacle 11b by the light condensing lens. Note that there are cases where a prism, or the like, which transforms an optical path of the multiplex optical signal emitted from the multiplexing optical system 40 and thus causes the multiplex optical signal to enter the light condensing lens, is provided between the AR filter 47 (the multiplexing optical system 40) illustrated in FIG. 3 and the light condensing lens. Also, there are cases where an isolator is provided between the AR filter 47 (the multiplexing optical system 40) and the light condensing lens.

Next, an example method for producing the optical transceiver 1 according to this embodiment will be described. Steps of mounting the semiconductor lasers 20, the lenses 30, and the multiplexing optical system 40 illustrated in FIG. 4 will be mainly described herein, and other steps will be omitted.

First, necessary members are prepared. Specifically, the first semiconductor laser 21, the second semiconductor laser 22, the third semiconductor laser 23, and the fourth semiconductor laser 24 illustrated in FIG. 4 are prepared (a semiconductor laser preparation step). Also, four first mounts 50 are prepared (a first mount preparation step). Furthermore, the first lens element 31, the second lens element 32, the third lens element 33, the fourth lens element 34, and the multiplexing optical system 40 are prepared (an optical system preparation step). In addition, the second mount 60 is prepared (a second mount preparation step).

Figure 7:
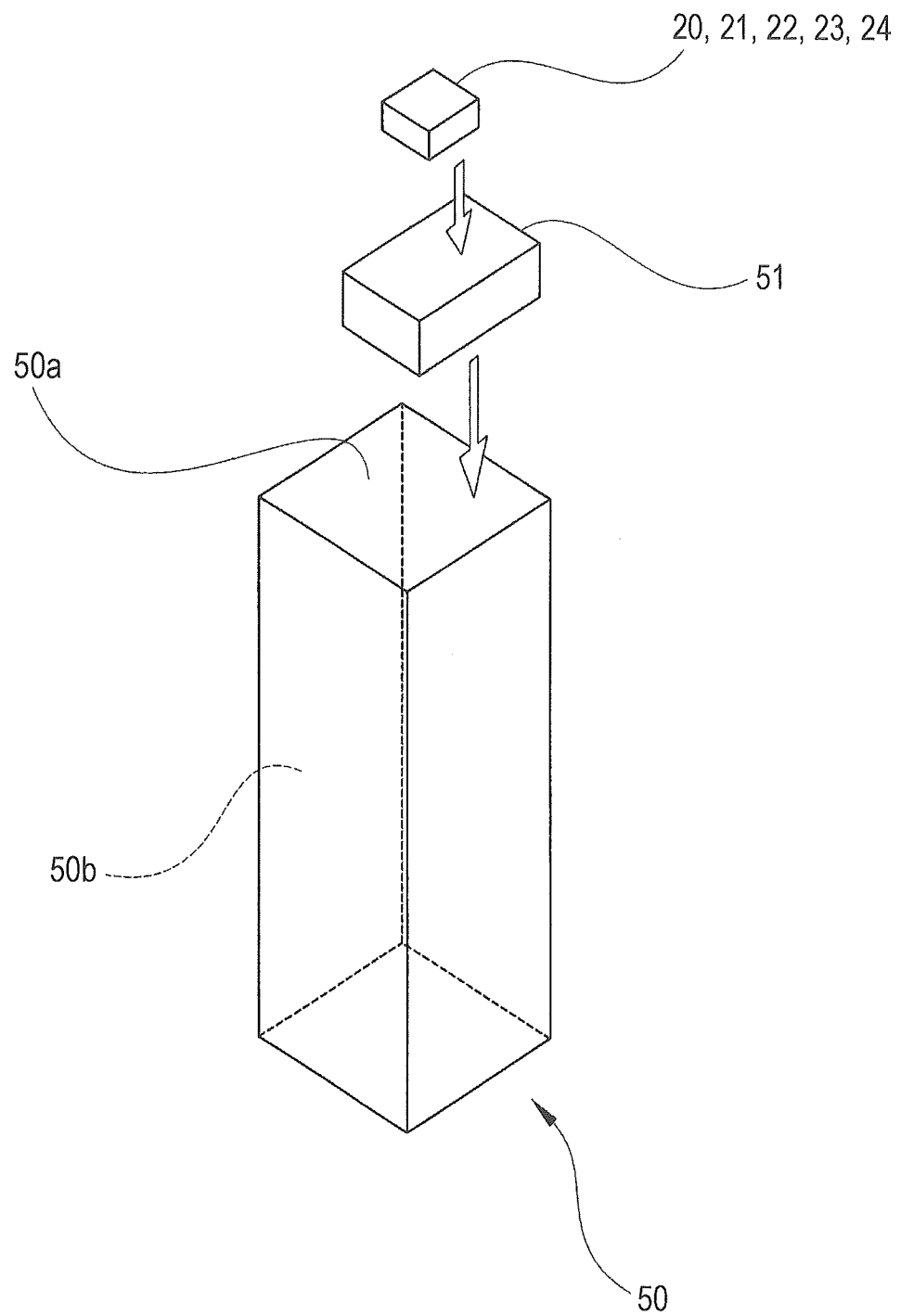
FIG. 7 is an explanatory view illustrating a step of mounting the semiconductor lasers on the first mount.

Next, each of the semiconductor lasers 20 is mounted on a corresponding one of the first mounts 50 (a semiconductor laser mounting step). Specifically, as illustrated in FIG. 7, the sub-mount 51 is mounted on a part of the first mounting surface 50a of the first mount 50 located at a predetermined position, and the semiconductor laser 20 is mounted on a part of the sub-mount 51 located at a predetermined position. As another option, the sub-mount 51, on which the semiconductor laser 20 was previously mounted, is mounted on a part of the first mounting surface 50a of the first mount 50 located at a predetermined position.

Next, each of the lenses 30 and the multiplexing optical system 40 are mounted on the second mount 60 (an optical system mounting step). Specifically, as illustrated in FIG. 6, the glass plate 41 and the bandpass filters 42, 43, and 44 are bonded to the side surface 45a of the substrate 45, and the reflection mirror 46 and the AR filter 47 are bonded to the side surface 45b of the substrate 45. Furthermore, after the glass plate 41 and the first lens 31 are aligned, the first lens 31 is bonded to the light incidence surface of the glass plate 41. Similarly, after the bandpass filter 42 and the second lens 32 are aligned, the second lens 32 is bonded to the light incidence surface of the bandpass filter 42. After the bandpass filter 43 and the third lens 33 are aligned, the third lens 33 is bonded to the light incidence surface of the bandpass filter 43. After the bandpass filter 44 and the fourth lens 34 are aligned, the fourth lens 34 is bonded to the light incidence surface of the bandpass filter 44. Thereafter, the substrate 45 is mounted on a part of the second mounting surface 60a of the second mount 60 located at a predetermined position. Note that either one of the semiconductor laser mounting step or the optical system mounting step may be executed first.

Figure 8:
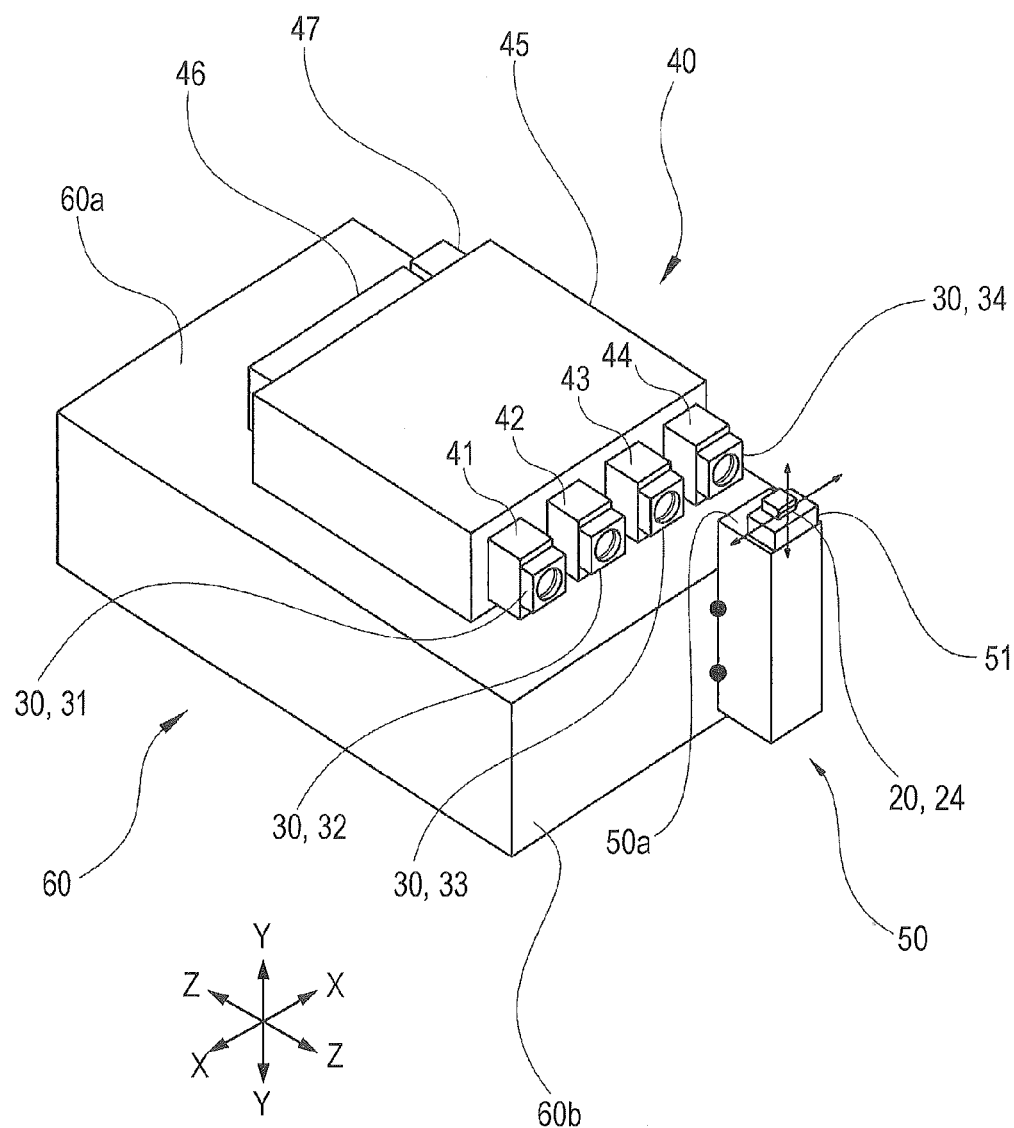
FIG. 8 is an explanatory view illustrating a step of aligning the semiconductor lasers and the lenses with one another.

Next, as illustrated in FIG. 8, after the fourth semiconductor laser 24 and the fourth lens element 34 are aligned, one of the first mounts 50 on which the fourth semiconductor laser 24 is mounted is fixed to the second mount 60. Specifically, the first side surface 50b (FIG. 7) of the first mount 50, on which the fourth semiconductor laser 24 is mounted, is made to abut the second side surface 60b of the second mount 60. Thereafter, the first mount 50 is moved up and down and left and right (in the X-axis direction and the Y-axis direction) on the second side surface 60b of the second mount 60, and the optical axis of light (which does not necessarily have to be an optical signal) emitted from the fourth semiconductor laser 24 is made to match the optical axis of the fourth lens element 34. In other words, the first mount 50 is moved in the X-axis direction and the Y-axis direction in a plane parallel to the second side surface 60b of the second mount 60, thereby aligning the fourth semiconductor laser 24 with the fourth lens element 34. For example, light emitted from the AR filter 47 is monitored by a camera, a power meter, or the like, and the first mount 50 is moved to determine the position of the first mount 50. When the position of the first mount 50 is determined, the first mount 50 is fixed in the position by performing YAG laser welding.

Next, the second mount 60 to which the first mount 50, on which the fourth semiconductor laser 24 is mounted, is fixed is accommodated in the package 11a (FIG. 3). Thereafter, the position of the light condensing lens (not illustrated) provided between the package 11a and the receptacle 11b and the position of the receptacle 11b are adjusted such that an output of light emitted from the ferrule (not illustrated) in the receptacle 11b illustrated in FIG. 3 is maximum, and the light condensing lens and the receptacle 11b are fixed to the package 11a.

Next, the rest of the first mounts 50 are fixed to the second mount 60 by performing YAG laser welding. Specifically, after the third semiconductor laser 23 and the third lens 33 are aligned such that an output of light emitted from the ferrule (not illustrated) in the receptacle 11b illustrated in FIG. 3 is maximum, the first mount 50 on which the third semiconductor laser 23 is mounted is fixed to the second mount 60. Note that the method for aligning the third semiconductor laser 23 and the third lens 33 is the same as the method (FIG. 8) for aligning the fourth semiconductor laser 24 and the fourth lens 34. Similarly, the first mount 50 on which the second semiconductor laser 22 is mounted is fixed to the second mount 60, and thereafter, the first mount 50 on which the first semiconductor laser 21 is mounted is fixed to the second mount 60. The first mounts 50 are fixed to the second mount 60 in this order to avoid a situation where a surface which is to be irradiated with a YAG laser is covered. Therefore, a surface which is to be irradiated with a YAG laser may be changed and the order in which the first mounts 50 are fixed to the second mount 60 may be changed to a different order from that described above.

As described above, in this embodiment, the substrate of the multiplexing optical system is made of glass, and the lenses are made of synthetic resin. That is, the substrate of the multiplexing optical system and the lenses have different linear expansion ratios. However, each of the lenses is fixed to a surface side of the substrate and does not contact the second mount. Furthermore, the lenses are independent from one another. Therefore, even when each of the substrates and the lenses, which have different linear expansion ratios, are thermally expanded, the optical axis of a lens and the optical axis of an optical member (such as a glass plate and a band filter), to which the lens is bonded, do not deviate from one another, or even if the optical axes deviate from one another, the deviation is small. Also, the optical axis of a lens and the optical axis of a semiconductor laser to which the lens corresponds do not deviate from one another or, if the optical axes deviate from one another, the deviation is small.

The present invention is not limited to the above-described embodiment and various modifications may be made without deviating from the scope and gist of the invention. For example, the material of a substrate of a multiplexing optical system is not limited to glass, and the material of a lens is not limited to synthetic resin. A lens is not limited to a collimate lens and may be replaced with a light condensing lens. The number of semiconductor lasers serving as light sources may be three or less or five or more. That is, the number of optical signals that are wavelength division multiplexed may be three or less or five or more.

A semiconductor laser is not limited to an edge emitting laser and may be a surface emitting laser (SEL), such as a vertical cavity surface emitting laser (VCSEL) or the like.

The quality of the material of each of a first mount and a second mount serving as supporting members may be changed, as appropriate. The quality of the material of a sub-mount provided between a semiconductor laser and the first mount may also be changed, as appropriate. For example, when importance is placed on radiation performance rather than insulation performance, a sub-mount made of metal can be used, instead of a sub-mount made of a ceramic. When insulation performance is needed, a sub-mount made of a dielectric material can be used, instead of a sub-mount made of a ceramic. Furthermore, a semiconductor laser may be directly mounted on a first mounting surface of the first mount without a sub-mount interposed therebetween.

A semiconductor laser may be mounted on the second mount. That is, the first mount in the above-described embodiment may be omitted.

The present invention is applicable to an optical communication module other than an optical transceiver.

What is claimed is:

1. An optical communication module circuit for outputting a multiplexed signal, the optical communication module comprising:
    a plurality of semiconductor lasers that emit optical signals with different wavelengths;
    a multiplexing optical system including a plurality of optical filters used for multiplexing the optical signals, each of which has been emitted from a corresponding one of the plurality of semiconductor lasers, and a substrate on which the optical filters are provided; and
    a plurality of lenses, each of the lenses being joined to a corresponding one of the plurality of optical filters to condense or collimate an optical signal emitted from a corresponding one of the semiconductor lasers to the optical filter and thereby enable the light signal to enter the optical filter,
    wherein
    the plurality of lenses are independent from one another and have a different linear expansion ratio from that of the substrate, and
    the plurality of lenses are not in contact with a supporting member on which the substrate is mounted.

2. The optical communication module according to claim 1,
    wherein
    the substrate is made of glass and the lens is made of synthetic resin.

3. The optical communication module according to claim 1,
    wherein
    light emission surfaces of the optical filters are joined to a surface of the substrate, and
    the lenses are joined to light incidence surfaces of the optical filters.

4. The optical communication module according to claim 1,
    wherein
    a non-reflection coat has been applied to the lenses.

5. The optical communication module according to claim 1, wherein a surface of the substrate is mounted on the supporting member, and the plurality of optical filters is joined to a side surface of the substrate.

6. The optical communication module according to claim 1, further comprising a reflection mirror joined to an other side surface of the substrate which is located on an opposite side to the surface on which the plurality of optical filters is mounted.

7. The optical communication module according to claim 1, wherein the plurality of lenses is fixed to a side surface of the substrate.

8. The optical communication module according to claim 1, wherein said each of the lenses are joined to the corresponding one of the plurality of optical filters such that there is no gap between a lens of the plurality of lenses and an optical filter of the plurality of optical filters, respectively.

9. The optical communication module according to claim 1, wherein said each of the lenses is directly joined to the corresponding one of the plurality of optical filters.

10. The optical communication module according to claim 1, wherein said each of the lenses is flush with the corresponding one of the plurality of optical filters with no intervening structure therebetween.

11. The optical communication module according to claim 1, wherein one of the optical filters comprises a glass plate and others of the optical filters comprise a bandpass filter, each of the glass plate and bandpass filters being bonded to a side surface of the substrate.

12. The optical communication module according to claim 11, wherein a lens of the plurality of lenses is bonded to a light incidence surface of the bandpass filter.

* * * * *